United States Patent
Sheng

(10) Patent No.: US 8,743,394 B2
(45) Date of Patent: Jun. 3, 2014

(54) IMAGE CAPTURING APPARATUS FOR ADJUSTING IMAGE ATTRIBUTES

(75) Inventor: Thomas Sheng, Hsinchu (TW)

(73) Assignee: Avision Inc. (TW)

( * ) Notice: Subject to any disclaimer, the term of this patent is extended or adjusted under 35 U.S.C. 154(b) by 810 days.

(21) Appl. No.: 12/783,074

(22) Filed: May 19, 2010

(65) Prior Publication Data
US 2011/0013222 A1    Jan. 20, 2011

(30) Foreign Application Priority Data

Jul. 14, 2009   (TW) ................................ 98123676 A
Dec. 18, 2009   (TW) ................................ 98143487 A

(51) Int. Cl.
*G06F 15/00*    (2006.01)

(52) U.S. Cl.
USPC ....... 358/1.15; 358/1.12; 358/1.17; 358/1.18; 358/448; 358/474

(58) Field of Classification Search
USPC ............. 358/1.15, 1.12, 1.17, 1.18, 448, 474, 358/486
See application file for complete search history.

(56) References Cited

U.S. PATENT DOCUMENTS

| | | | |
|---|---|---|---|
| 7,002,700 B1* | 2/2006 | Motamed | 358/1.1 |
| 2004/0212846 A1* | 10/2004 | Baunach et al. | 358/471 |
| 2006/0238780 A1* | 10/2006 | Dennison | 358/1.9 |
| 2009/0034731 A1* | 2/2009 | Oshima | 380/270 |
| 2009/0051981 A1* | 2/2009 | Kuboki | 358/474 |
| 2009/0219580 A1* | 9/2009 | Cornell et al. | 358/474 |
| 2009/0325571 A1* | 12/2009 | Wentink | 455/423 |
| 2010/0053667 A1* | 3/2010 | Honda | 358/1.15 |

* cited by examiner

*Primary Examiner* — Steve Kau
*Assistant Examiner* — Mark Milia

(57) ABSTRACT

An image capturing apparatus includes a housing, a processor module, a sheet feeder, an image capturing assembly, a display module and an operation interface. The image capturing assembly captures both of first and second images of a document sheet, past a scan region and transported by the sheet feeder, and produces first and second image data representative of the first and second images in either a single-sided or double-sided scanning mode. The display module displays representation images of the first and second images. The operation interface receives user input and outputs a selection signal comprising information of selecting at least one of the first and second images. The processor module processes at least one of the first and second image data into output image data according to the selection signal.

20 Claims, 4 Drawing Sheets

IMAGE CAPTURING APPARATUS FOR ADJUSTING IMAGE ATTRIBUTES

This application claims priority of Nos. 098123676 and 098143487 respectively filed in Taiwan R.O.C. on Jul. 14, 2009 and Dec. 18, 2009 under 35 USC 119, the entire contents of which are hereby incorporated by reference.

BACKGROUND OF THE INVENTION

1. Field of the Invention

The invention relates to an image capturing apparatus having a sheet feeder, and more particularly to a duplex image capturing apparatus which can adjust scanned image attributes before outputting the scanned images.

2. Related Art

In a conventional duplex scanner equipped with a sheet feeder, two modes may be entered when document images are being captured. First, in a single-sided scanning mode, after a user presses a start button, the scanner scans one side of a document sheet and then processes the captured image. On the other hand, in a double-sided scanning mode, after the user presses the start button, the scanner scans a first side and a second side of the document sheet and processes the captured images of the first and second sides of the document sheet in one single scanning operation.

When using the duplex scanner to scan a single side of a document sheet, the user has to know the location of the scanning head or which one of the two scanning heads is activated in the single-sided scanning mode, in order to correctly place the document sheet to get the desired result, or otherwise a page of a blank, black or unwanted image may be obtained.

Or, in the situation when the user wishes to scan or copy a stack of single-sided document sheets and the document sheets are not arranged in order and have some unwanted document sheets, the user may choose to rearrange the document sheets and remove the unwanted document sheets before placing the stack of document sheets on the paper feeding tray of the sheet feeder, or the user may decide to sort the scanned images or copies afterwards. In either way, it is wasteful with respect to paper, toner, time and electric power.

SUMMARY OF THE INVENTION

It is therefore an object of the invention to provide an image capturing apparatus for adjusting image attributes, so that a user, when operating this image capturing apparatus, can immediately view the images and set the image scanning attributes according to the displayed images in order to obtain desired output image data.

To achieve the above-identified object, the invention provides an image capturing apparatus including a housing, a processor module, a sheet feeder, an image capturing assembly, a display module and an operation interface. The sheet feeder, connected to and controlled by the processor module, transports a document sheet past a scan region. The image capturing assembly, disposed within the scan region and connected to and controlled by the processor module, captures both of a first image and a second image of the document sheet transported past the scan region and produces first image data and second image data representative of the first image and the second image in either a single-sided scanning mode or a double-sided scanning mode of the image capturing apparatus. The display module is connected to the processor module and displays representation images of both of the first and second images. The operation interface, connected to the processor module, receives user input and outputs a selection signal which includes information of selecting at least one of the first image data and the second image data. The processor module processes at least one of the first image data and the second image data into output image data according to the selection signal. The processor module, the sheet feeder, the image capturing assembly and the display module are mounted in the housing.

Therefore, the user may select to process some pages according to the viewed images in order to avoid the time and resources being wasted.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this

BRIEF DESCRIPTION OF THE DRAWINGS

The present invention will become more fully understood from the detailed description given hereinbelow and the accompanying drawings which are given by way of illustration only, and thus are not imitative of the present invention.

DETAILED DESCRIPTION OF THE INVENTION

The present invention will be apparent from the following detailed description, which proceeds with reference to the accompanying drawings, wherein the same references relate to the same elements.

Figure 1:
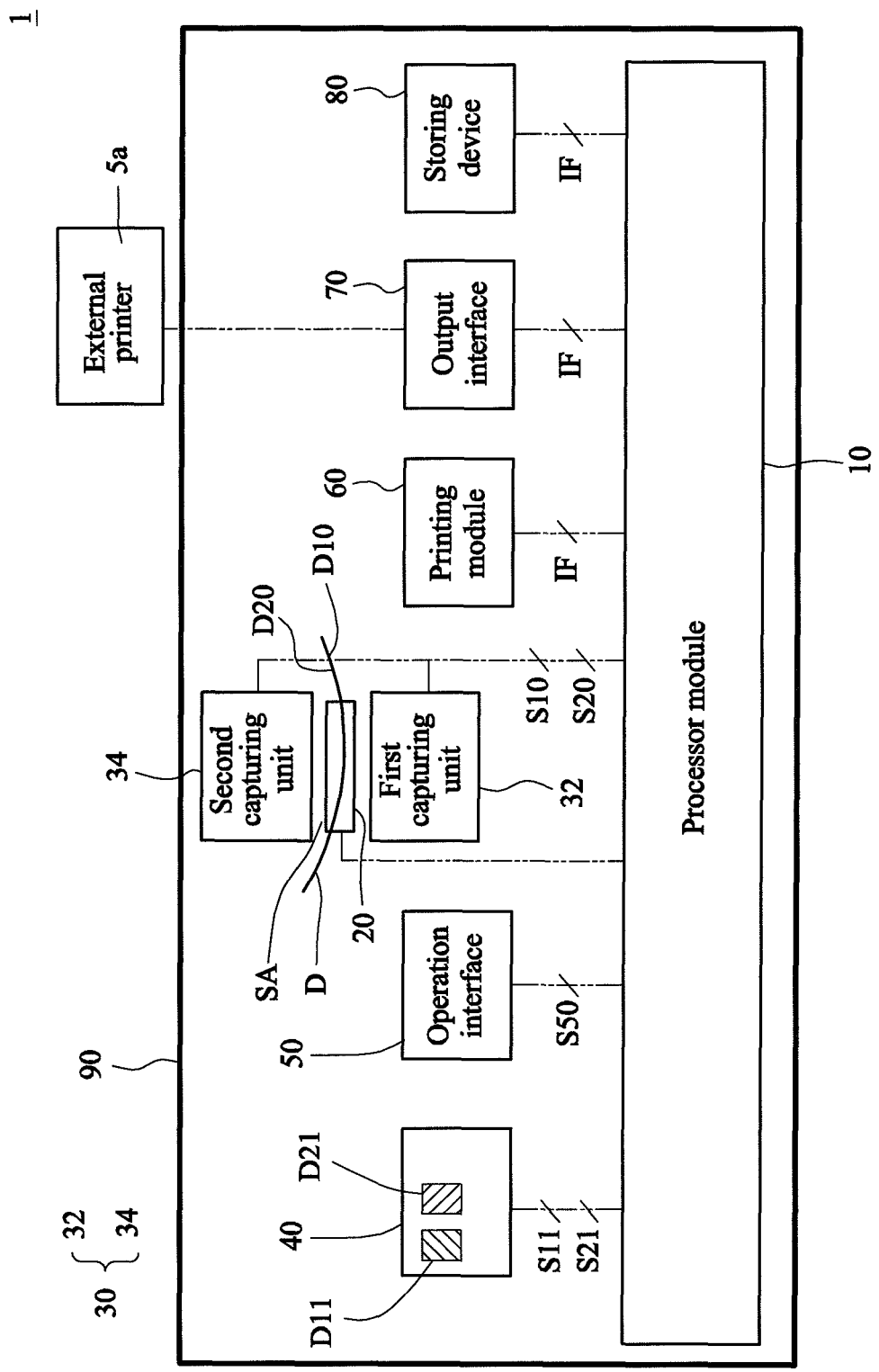
FIG. 1 is a schematic illustration showing an image capturing apparatus according to a preferred embodiment of the invention.

FIG. 1 is a schematic illustration showing an image capturing apparatus 1 according to a preferred embodiment of the invention. Referring to FIG. 1, the image capturing apparatus 1 of this embodiment includes a housing 90, a processor module 10, a sheet feeder 20, an image capturing assembly 30, a display module 40 and an operation interface 50.

The processor module 10, the sheet feeder 20, the image capturing assembly 30, the display module 40 and the operation interface 50 are mounted in the housing 90.

The sheet feeder 20 is connected to and controlled by the processor module 10 to transport a document sheet D past a scan region SA. The document sheet D may have a front side and a backside. Any electrical unit in this invention may be coupled to another electrical unit through a cabled or wireless connection.

The image capturing apparatus 1 is switchable between a single-sided scanning mode and a double-sided scanning mode. The image capturing assembly 30, disposed within the scan region SA and connected to and controlled by the processor module 10, captures both of a first image D10 and a second image D20 of the document sheet D transported past the scan region SA and produces first image data S10 and second image data S20 representative of the first image D10 and the second image D20 in either the single-sided scanning mode or the double-sided scanning mode. That is, no matter which mode is activated, the image capturing assembly always captures images of both sides of the document sheet D, instead of capturing one single image in the single-sided scanning mode.

In one embodiment, the first image and the second image correspond to the front side image D10 and the backside image D20 of the document sheet D, respectively. The image capturing assembly 30 may be a one-pass duplex image capturing assembly, which includes a first capturing unit 32 and a second capturing unit 34, i.e., two scanning heads, for capturing at the same time the front side image D10 and the backside image D20 of the document sheet D transported past the scan region SA, and producing the first image data S10 and the second image data S20 representative of the first image D10 and the second image D20.

The display module 40 is connected to the processor module 10 which generates a first display signal S11 and a second display signal S21 corresponding to the first image data S10 and the second image data S20. The display module 40 receives the first display signal S11 and the second display signal S21, and displays both of a first representation image D11 and a second representation image D21 respectively corresponding to the first display signal S11 and the second display signal S21.

The display module 40 displays the first representation image D11 and the second representation image D21, so that the user can identify and select a desired one of the two images via the operation interface 50.

The operation interface 50, connected to the processor module 10, receives user input for selecting at least one of the first image D10 and the second image D20 and generates a corresponding selection signal S50. The processor module 10 generates output image data IF according to the selection signal S50. If the selection signal S50 comprises information of selecting the first image D10, then the processor module 10 would process the first image data S10 into the output image data IF for output to a designated device. If the selection signal S50 comprises information of selecting both of the first image D10 and the second image D20, then the processor module 10 would process both of the first image data S10 and the second image data S20 into the output image data IF for output to a designated device. The selection signal S50 may include an index code assigned specifically to the first image data S10 and the second image data S20 stored in a buffer memory of the image capturing apparatus 1. The processor module 10 retrieves from the buffer memory the image data corresponding to the particular index code. The operation interface 50 may be connected to the processor module 10 by a cable or a wireless link. In the double-sided scanning mode (also referred to as a double-sided image data output mode), the processor module 10 would process both of the first image data S10 and the second image data S20 to generate the output image data IF. In the single-sided scanning mode (also referred to as a single-sided image data output mode), the processor module 10 would process only one of the first image data S10 and the second image data S20, as selected by the user, to generate the output image data IF.

In addition, the image capturing apparatus 1 of the invention may further include a printing module 60, connected to the processor module 10, for receiving the output image data IF and performing a printing operation of printing the output image data IF on recording media. The printing module 60 may be a printer connected to the processor module 10 by a cable or a wireless link, or an external printer 5a connected to the image capturing apparatus 1.

A storing device 80, connected to the processor module 10, stores the output image data IF. The storing device 80 may be a local volatile or non-volatile memory of the image capturing apparatus 1, an external storage device, or a remote memory, such as a file server 2 (see FIG. 2) connected to the image capturing apparatus 1 through the network.

Figure 2:
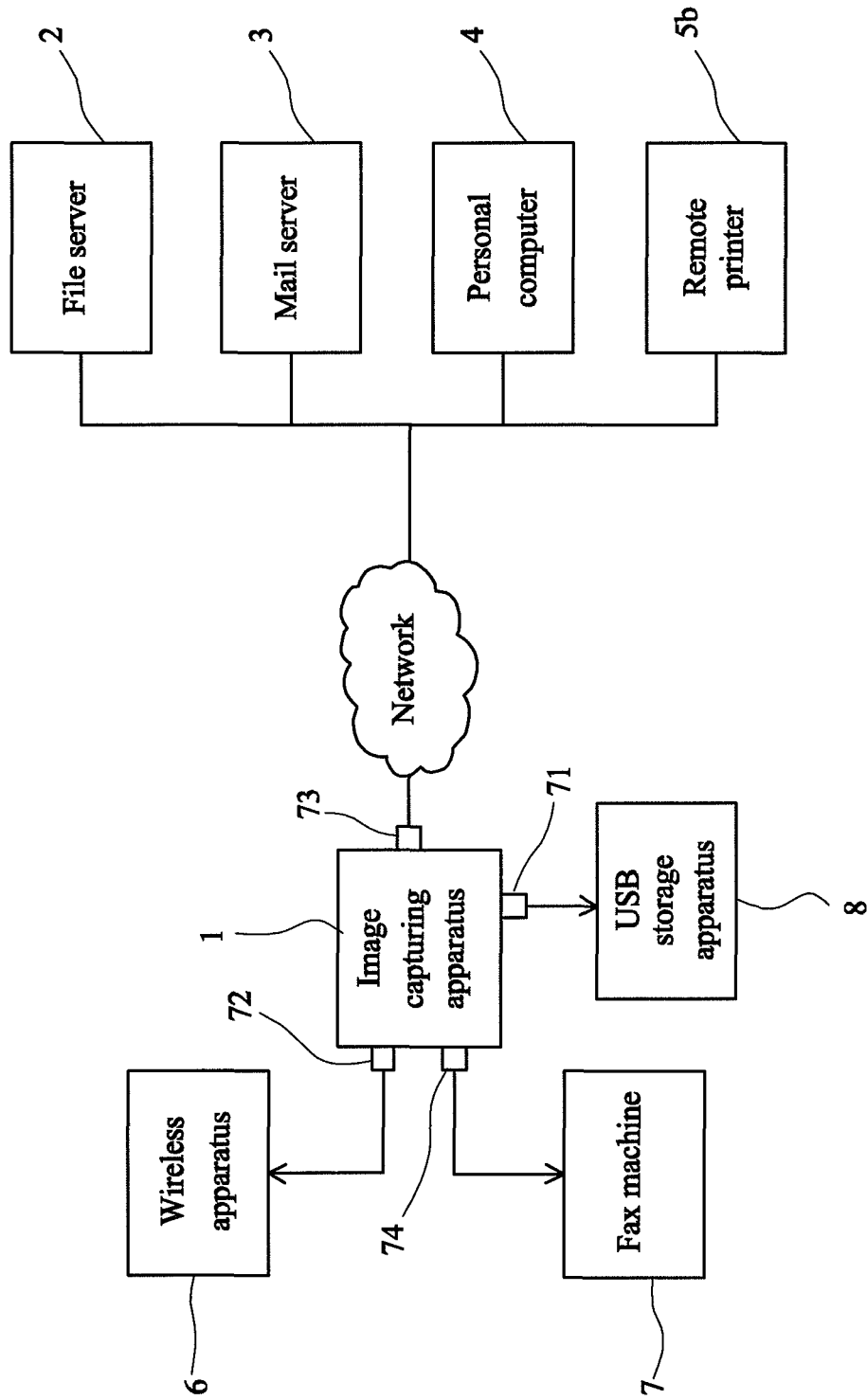
FIG. 2 is a schematic illustration showing the image capturing apparatus connected to other apparatuses through output interfaces according to the invention.

Therefore, as shown in FIG. 1, the image capturing apparatus 1 of the invention may further include an output interface 70, connected to the processor module 10, for transmitting the output image data IF to the designated destinations selected by the user through the operation interface 50. The selection signal S50 may also include a destination address of the output image data IF. FIG. 2 illustrates examples of output interfaces. The output interface 70 may be a universal serial bus (USB) interface 71, a wireless communication interface 72, a network interface 73 or a telecommunication communication interface 74, which outputs the output image data IF to the destinations. The wireless communication interface 72 is connected to a wireless apparatus 6. The designated destinations may be located on a USB storage apparatus 8, such as a flash disk and portable hard drive, a wireless device, such as a mobile phone and personal digital assistant (PDA), a remote terminal, such as the file server 2, mail server 3, remote personal computer 4 and remote printer 5b, or a fax machine 7.

In addition, the output interface 70 and the printing module 60 may co-exist. For example, the built-in printing module 60 of the image capturing apparatus 1 may print only black-and-white pictures or documents. However, once the user wishes to print color pictures or documents, the image capturing apparatus 1 can achieve this object by transmitting the output image data IF through the output interface 70, such as the USB interface 71 or the network interface 73, to a color printer 5b. Alternatively, the image capturing apparatus 1 may be equipped with only one of the output interface 70 and the printing module 60.

Figure 3:
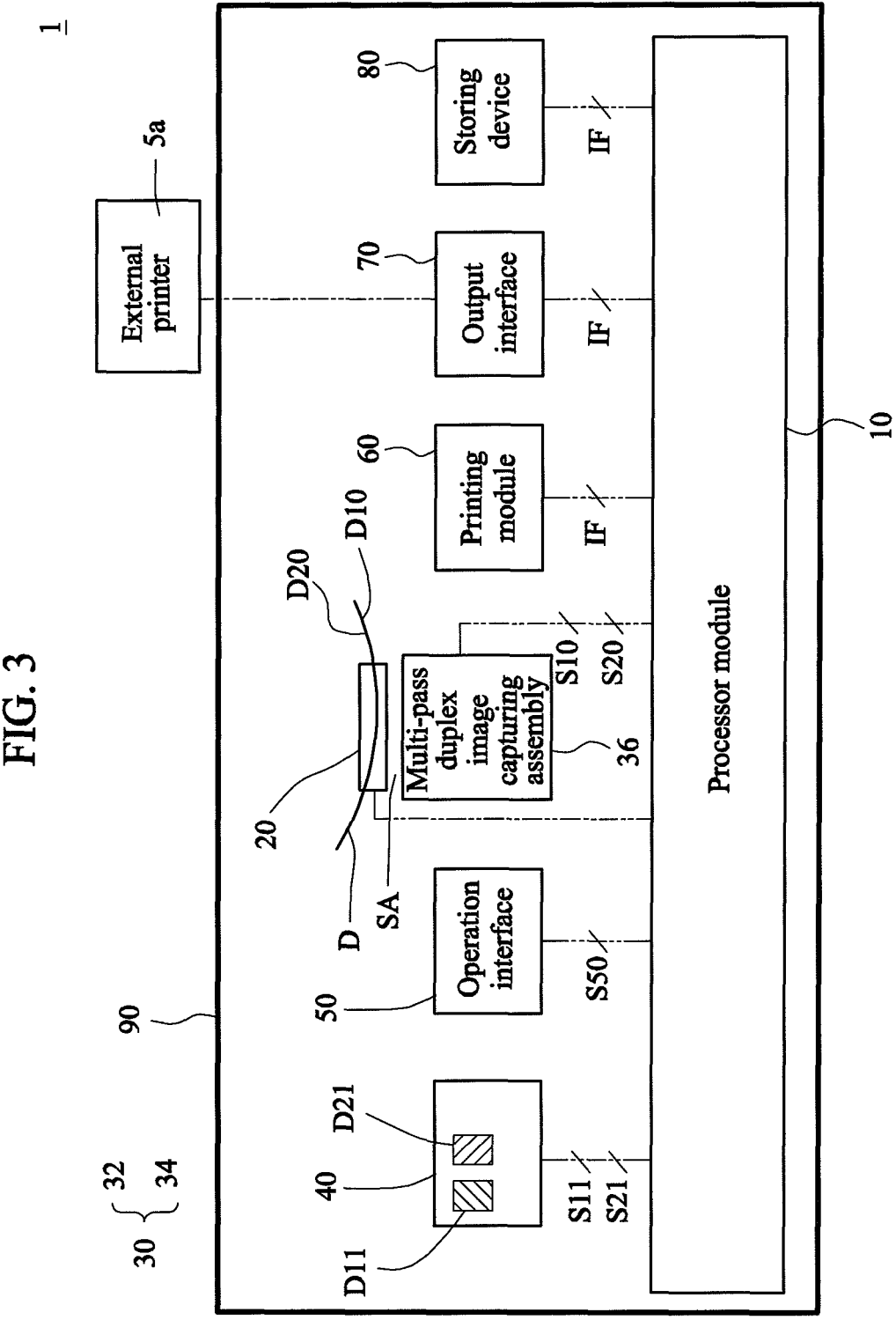
FIG. 3 is a schematic illustration showing an image capturing apparatus according to another preferred embodiment of the invention.

FIG. 3 is a schematic illustration showing an image capturing apparatus according to another preferred embodiment of the invention. As shown in FIG. 3, the image capturing assembly 30 is a multi-pass duplex image capturing assembly 36 comprising only one image capturing unit, i.e., one scanning head, for successively capturing the front side image D10 and the backside image D20 of the document sheet D transported past the scan region SA. In this case, the sheet feeder 20 is a recirculation type of feeder which transports the document sheet D at least twice past the scan region SA to complete a scan for the both sides of the document sheet D.

Figure 4:
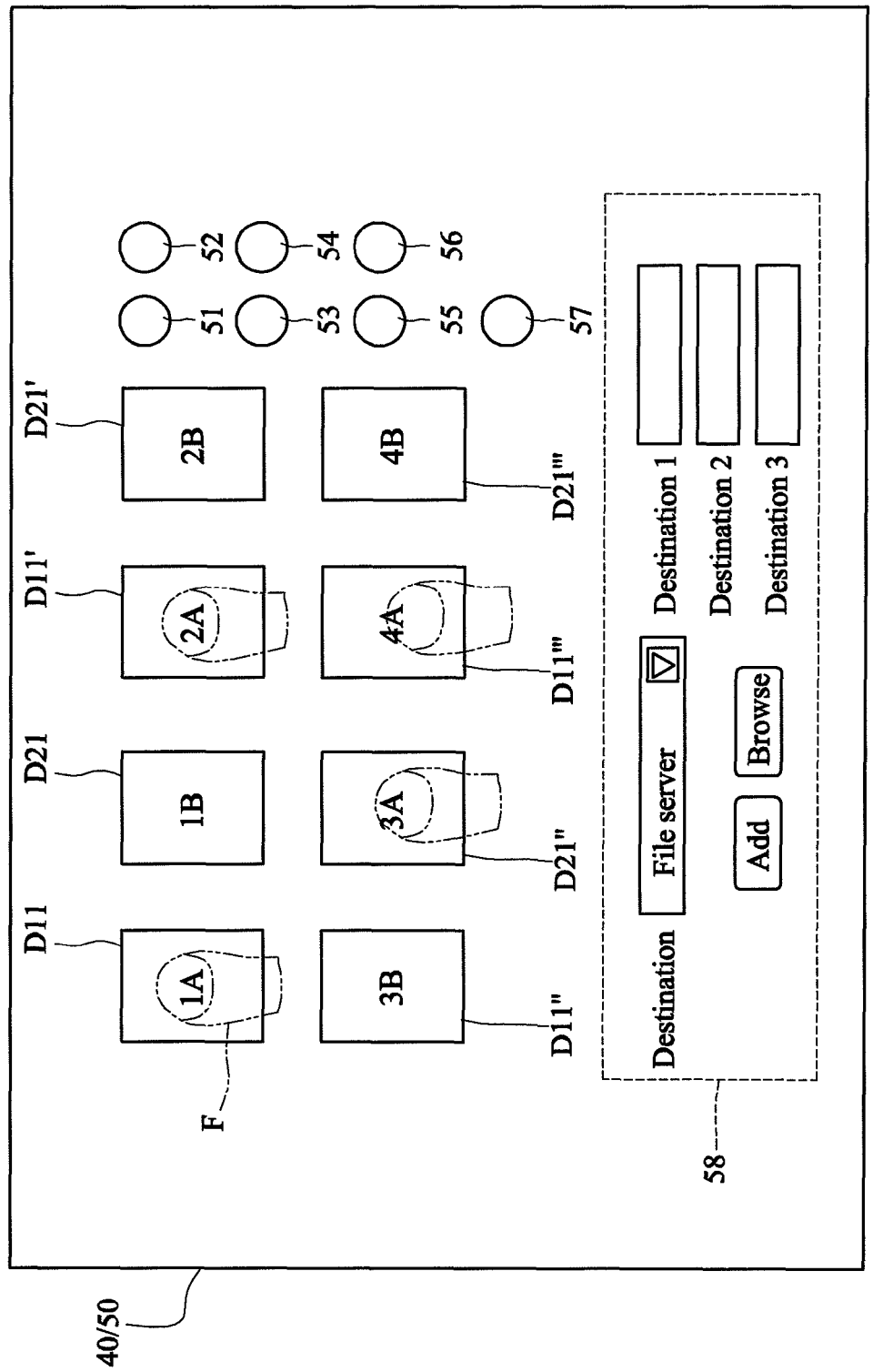
FIG. 4 is a schematic illustration showing a layout of a display module and an operation interface.

FIG. 4 is a schematic illustration showing a layout of the display module 40 and the operation interface 50. As shown in FIG. 4, the operation interface 50 and the display module 40 may be integrated into a touch screen 40/50. However, the invention is not limited thereto. In this embodiment, four document sheets are being scanned. The representation images D11, D21, D11', D21', D11'', D21'', D11''' and D21''' displayed on the touch screen 40/50 respectively have the marks of 1A, 1B, 2A, 2B, 3B, 3A, 4A and 4B, and the image data would be outputted in the same order if a user does not make any correction to the order. The cause for the representation images to be displayed in such order may be that the user misplaces the document sheets, so that the image of 2B is followed by the image of 3B, instead of the image of 3A. This invention provides the advantage for the user to be able to view the images first, so that the user can select the images of which he wishes to make a copy. The misplacement of the document sheets does not pose a problem to the copying operation.

The touch screen 40/50 also receives user inputs for adjusting the scanned image attributes. The touch screen 40/50 may include a rotation selection button 51 to be operated by the user, so that the selection signal S50 further includes the information of rotating at least one of the images of the document sheets. For example, the user may press the rotation selection button 51 by his finger F, and clicks the representation images D11, D11', D21" and D11'" on the touch screen to generate the selection signal S50. The processor module 10 would process the corresponding image data into the output image data IF having pages containing the images of the rotated 1A, 2A, 3A and 4A.

In addition, the touch screen 40/50 may include a scaling selection button 52 to be operated by the user, so that the selection signal S50 may include the information of scaling at least one of the images of the document sheets. For example, the user may press the scaling selection button 52 by his or her finger F and click the representation images D11, D11', D21" and D11'" on the touch screen to generate the selection signal S50. The processor module 10 would process the corresponding image data into the output image data IF having pages containing the images of the scaled 1A, 2A, 3A and 4A. The image data corresponding to the representation images D21, D21', D11" and D21'" would not be processed into the output image data IF.

In addition, the touch screen 40/50 may include a merge selection button 53 to be operated by the user, so that the selection signal S50 further includes the information of merging at least two of the images of the document sheets. For example, the user may press the merge selection button 53 by his or her finger F and click the representation images D11, D11', D21" and D11'" on the touch screen 40/50 to generate the selection signal S50. The processor module 10 would process the corresponding image data into the output image data IF having pages containing the merged images of 1A, 2A, 3A and 4A.

In addition, the touch screen 40/50 may include a blank-page-insertion selection button 54 to be operated by the user, so that the selection signal S50 further includes the information of inserting a blank image between, after and/or before the images of the document sheets. The processor module 10 would process, according to the selection signal S50, the corresponding image data into the output image data IF having pages containing a blank image.

In addition, the touch screen 40/50 may include a mark-merge selection button 55 to be operated by the user, so that the selection signal S50 further includes the information of merging a mark image with at least one of the images of the document sheets. The processor module 10 would process, according to the selection signal S50, the corresponding image data into the output image data IF having pages containing the selected image merged with the mark image. The mark image may include a trademark, a company name, a personal name, or the like.

In addition, the touch screen 40/50 may include a copy-count selection button 56 to be operated by the user, so that the selection signal S50 further includes the information of the copy count of at least one of the images of the document sheets. If the user wishes to make two copies of the image represented by the representation image D11 and five copies of the image represented by the representation image D11'", the user can click the representation images D11 and D11'" and select the desired number of copies, so that the customized requirement may be fulfilled.

In addition, the touch screen 40/50 may include an image-sorting selection button 57 to be operated by the user, so that the selection signal S50 further includes the information of sorting the order of the images and the user can obtain the output image data IF having pages in the desired order.

The touch screen 40/50 may further include a designated destination selection field 58. For example, the output image data IF may be transferred to the designated destination on the file server 2 as selected or inputted by the user at the designated destination selection field 58. It is to be noted that the user can set multiple designated destinations at a time, so that the data may be shared with other users, as shown in the designated destination selection field 58 of FIG. 4.

According to the embodiment of the invention, the user can view the scanned images immediately and set the parameters of image processing, or even can select whether to perform any special image processing tasks, such as rotating, scaling, image merging of two images, blank-image inserting, image merging between one image and one mark, image sorting, or the like. The image capturing apparatus of the present invention transfers the processed output image data to the designated destination set by the user, or simply store the output image data to the local memory of the image capturing apparatus or to an external memory device. The user can log into the image capturing apparatus to access the stored output image data directly. With the image capturing apparatus of the invention, it is possible to obtain the more convenient and more human-oriented operation environment to eliminate the wastage of consumable materials, such as toner, ink or sheets.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:

1. An image capturing apparatus for adjusting image attributes, comprising:
    a housing;
    a processor module;
    a sheet feeder, connected to and controlled by the processor module, for transporting a document sheet past a scan region;
    an image capturing assembly, disposed within the scan region and connected to and controlled by the processor module, wherein, in a single-sided image data output mode of the image capturing apparatus, the image capturing assembly captures both of a first image and a second image of the document sheet transported past the scan region and produces first image data and second image data representative of the first image and the second image, and the first image and the second image respectively correspond to a front side image and a back-side image of the document sheet;
    a display module, connected to the processor module, for displaying representation images of both of the first and second images; and
    an operation interface, connected to the processor module, for receiving user input and outputting a selection signal which comprises information of selecting at least one of the first image and the second image, wherein, in the single-sided image data output mode of the image capturing apparatus, the processor module processes one of the first image data and the second image data into output image data according to the selection signal.

2. The apparatus according to claim 1, further comprising:
    a printing module, disposed in the housing and connected to the processor module, for receiving the output image data and performing a printing operation.

3. The apparatus according to claim 1, further comprising:
an output interface, connected to the processor module, for transmitting the output image data to a designated destination.

4. The apparatus according to claim 3, wherein the output interface comprises a universal serial bus (USB) interface, and the designated destination is located on a USB storage apparatus.

5. apparatus according to claim 3, wherein the output interface comprises a wireless communication interface, and the designated destination is located on an apparatus connected to the image capturing apparatus by a wireless link.

6. The apparatus according to claim 3, wherein the output interface comprises a network interface, and the designated destination is located on a remote terminal.

7. The apparatus according to claim 3, wherein the output interface comprises a telecommunication communication interface, and the designated destination is located on a fax machine.

8. The apparatus according to claim 3, wherein the designated destination is located on a remote printer.

9. The apparatus according to claim 1, wherein the image capturing assembly is a one-pass duplex image capturing assembly, comprising a first capturing unit and a second capturing unit for capturing at the same time the front side image and the backside image of the document sheet transported past the scan region.

10. The apparatus according to claim 1, wherein the image capturing assembly is a multi-pass duplex image capturing assembly, comprising one single image capturing unit for successively capturing the front side image and the backside image of the document sheet transported past the scan region.

11. The apparatus according to claim 1, wherein the selection signal further comprises information of rotating at least one of the first image and the second image.

12. The apparatus according to claim 1, wherein the selection signal further comprises information of scaling at least one of the first image and the second image.

13. apparatus according to claim 1, wherein the selection signal further comprises information of merging the first image and the second image together.

14. The apparatus according to claim 1, wherein the selection signal further comprises information of inserting a blank image between, before and/or after the first image and the second image.

15. apparatus according to claim 1, wherein the selection signal further comprises information of merging a mark image and at least one of the first image and the second image together.

16. The apparatus according to claim 1, wherein the operation interface is connected to the processor module by a wireless link.

17. The apparatus according to claim 1, wherein the operation interface and the display module are integrated into a touch screen.

18. The apparatus according to claim 1, wherein the processor module, the sheet feeder, the image capturing assembly and the display module are mounted in the housing.

19. An image capturing apparatus for adjusting image attributes, comprising:
a housing;
a processor module;
a sheet feeder, connected to and controlled by the processor module, for transporting a document sheet past a scan region;
an image capturing assembly, disposed within the scan region and connected to and controlled by the processor module, wherein, in a single-sided image data output mode of the image capturing apparatus, the image capturing assembly captures both of a first image and a second image of the document sheet transported past the scan region and produces first image data and second image data representative of the first image and the second image, and the first image and the second image respectively correspond to a front side image and a backside image of the document sheet;
a display module, connected to the processor module, for displaying representation images of both of the first and second images; and
an operation interface, connected to the processor module, for receiving user input and outputting a selection signal which comprises information of selecting at least one of the first image and the second image, wherein, in the single-sided image data output mode of the image capturing apparatus, the processor module processes only one of the first image data and the second image data into output image data for printing according to the selection signal.

20. The apparatus according to claim 19, further comprising:
a printing module, disposed in the housing and connected to the processor module, for receiving the output image data and performing a printing operation.

* * * * *